US010970766B2

(12) United States Patent
Beans

(10) Patent No.: US 10,970,766 B2
(45) Date of Patent: Apr. 6, 2021

(54) SYSTEM AND METHOD FOR ADJUSTING ENVIRONMENTAL CONDITIONS AT A VENUE BASED ON REAL TIME USER-SPECIFIED DATA

(71) Applicant: Eric Beans, Orlando, FL (US)

(72) Inventor: Eric Beans, Orlando, FL (US)

( * ) Notice: Subject to any disclaimer, the term of this patent is extended or adjusted under 35 U.S.C. 154(b) by 301 days.

(21) Appl. No.: 16/059,987

(22) Filed: Aug. 9, 2018

(65) Prior Publication Data

US 2020/0051151 A1   Feb. 13, 2020

(51) Int. Cl.
| | | |
|---|---|---|
| G06Q 30/06 | (2012.01) | |
| H04W 4/33 | (2018.01) | |
| H04W 4/021 | (2018.01) | |
| H04L 12/28 | (2006.01) | |

(52) U.S. Cl.
CPC ..... *G06Q 30/0621* (2013.01); *H04L 12/2829* (2013.01); *H04W 4/021* (2013.01); *H04W 4/33* (2018.02)

(58) Field of Classification Search
CPC ......... G06Q 30/06; G06Q 20/32; G05B 15/02
See application file for complete search history.

(56) References Cited

U.S. PATENT DOCUMENTS

| | | | | |
|---|---|---|---|---|
| 7,496,527 B2* | 2/2009 | Silverstein | ............ | G06Q 20/04 705/26.8 |
| 7,856,360 B2* | 12/2010 | Kramer | ............. | G06Q 30/0212 705/1.1 |
| 8,751,319 B2* | 6/2014 | Silverstein | ......... | G06Q 30/0633 705/26.1 |
| 8,799,220 B2* | 8/2014 | O'Malley | ........... | G06F 16/9574 707/627 |
| 8,935,279 B2* | 1/2015 | Skeen | ................ | H04L 65/4084 707/769 |
| 10,057,615 B2* | 8/2018 | Mulligan | ............. | G01N 33/487 |
| 10,228,900 B2* | 3/2019 | Dion | .................... | H04N 21/439 |
| 10,546,326 B2* | 1/2020 | Publicover | ......... | H04N 21/6582 |
| 10,580,043 B2* | 3/2020 | Publicover | ......... | H04N 21/2187 |
| 10,765,325 B2* | 9/2020 | Berkey | ................ | A61B 5/7278 |
| 2004/0093281 A1* | 5/2004 | Silverstein | ............ | G06Q 20/24 705/26.8 |
| 2008/0281472 A1* | 11/2008 | Podgorny | ............. | G05B 15/02 700/276 |
| 2008/0306826 A1* | 12/2008 | Kramer | ............. | G06Q 30/0212 705/14.14 |
| 2009/0006418 A1* | 1/2009 | O'Malley | ........... | G06Q 20/203 |

(Continued)

*Primary Examiner* — Oluseye Iwarere
(74) *Attorney, Agent, or Firm* — Jason T. Daniel, Esq.; Daniel Law Offices, P.A.

(57) ABSTRACT

A system and method for providing user-specified data to participating venues includes a system services environment having a website or App, and that facilitates communication between a user and a venue. The system includes functionality for uploading a plurality of user preferences for storage by the system environment server and/or decentralized blockchain nodes, identifying the presence of each user interface device that is physically located at or near a venue, generating a report containing the cumulative favorite selections within each preference category submitted by each of identified user interface devices, submitting the report to the venue and/or environmental devices and/or nodes, and changing the environmental conditions of the venue in real time based on the report.

12 Claims, 4 Drawing Sheets

(56) References Cited

U.S. PATENT DOCUMENTS

| | | | | |
|---|---|---|---|---|
| 2009/0070230 A1* | 3/2009 | Silverstein | G06Q 20/12 | 705/26.1 |
| 2009/0119013 A1* | 5/2009 | O'Malley | G06Q 20/203 | 701/431 |
| 2010/0162117 A1* | 6/2010 | Basso | H04S 7/301 | 715/716 |
| 2011/0093340 A1* | 4/2011 | Kramer | G06Q 30/02 | 705/14.58 |
| 2013/0282490 A1* | 10/2013 | Kramer | G06Q 30/0261 | 705/14.58 |
| 2016/0042520 A1* | 2/2016 | Taneja | G06K 9/00624 | 382/154 |
| 2016/0091217 A1* | 3/2016 | Verberkt | H04L 67/025 | 700/276 |
| 2016/0095188 A1* | 3/2016 | Verberkt | H05B 47/11 | 315/151 |
| 2016/0228640 A1* | 8/2016 | Pindado | A61N 1/36139 | |
| 2016/0259419 A1* | 9/2016 | Chatterjee | G01S 13/878 | |
| 2017/0108235 A1* | 4/2017 | Guan | H05B 47/19 | |
| 2017/0126749 A1* | 5/2017 | Jones-McFadden | H04L 65/1069 | |
| 2017/0201779 A1* | 7/2017 | Publicover | G06Q 30/0251 | |
| 2017/0286059 A1* | 10/2017 | Dion | G06Q 30/02 | |
| 2018/0032997 A1* | 2/2018 | Gordon | G06Q 30/0269 | |
| 2018/0059913 A1* | 3/2018 | Penilla | H04W 12/0608 | |
| 2018/0204213 A1* | 7/2018 | Zappier | H04L 63/10 | |
| 2018/0285465 A1* | 10/2018 | Schaffernoth | G06F 16/29 | |
| 2018/0292100 A1* | 10/2018 | Hunka | G05D 23/1904 | |
| 2019/0025202 A1* | 1/2019 | Mulligan | G01N 15/1484 | |
| 2019/0097826 A1* | 3/2019 | Lewis | H04L 67/306 | |
| 2019/0130733 A1* | 5/2019 | Hodge | G06K 9/00771 | |
| 2019/0171171 A1* | 6/2019 | Verteletskyi | G06Q 50/265 | |
| 2019/0265868 A1* | 8/2019 | Penilla | B60N 2/0228 | |
| 2019/0303807 A1* | 10/2019 | Gueye | G06Q 10/02 | |
| 2019/0354074 A1* | 11/2019 | Clair | F24F 11/63 | |
| 2020/0051151 A1* | 2/2020 | Beans | G06Q 30/0621 | |
| 2020/0167124 A1* | 5/2020 | Dion | H04N 21/4788 | |
| 2020/0249822 A1* | 8/2020 | Penilla | H04L 67/12 | |

* cited by examiner

User Preferences, 300

User Name: _____

Account Details: _____

Settings

-Automatically send preferences Y☐ N☐

-Contact me at venue for data
☐ Text
☐ email          310

Entertainment -

- Preferred video:
- Sports
  Golf  Football  Hockey  Baseball
  ☐      ☐         ☐        ☐ ...
- Movies
  Action  Drama  Comedy
  ☐        ☐       ☐ ...
- Television
  News  Soaps  Comedy
  ☐       ☐       ☐
  ---     ---     ---
  ---     ---     ---
            320

Music - Allow system access to content stored on your devices? Y☐ N☐
- Preferred volume level:

None  Soft  Medium  Loud
  ☐      ☐      ☐       ☐         330

- Select music by genre:

Rock  Classic  Jazz  Country
  ☐      ☐         ☐      ☐
  ---    ---       ---    ---
  ---    ---       ---    ---
  ---    ---       ---    ---

Atmosphere -                          340

- Preferred lighting:
  Low  Medium  Bright
  ☐     ☐        ☐
- Preferred temperature:
  ____ Insert number F°

Consumables -

- Beverages:

Soda  Wine  Beer  Spirits  Cocktails
  ☐      ☐      ☐     ☐         ☐
350  ---   ---   ---   ---       ---
     ---   ---   ---   ---       ---

- Food:

Meat  Veggies  Salad  Dessert
  ☐      ☐        ☐       ☐
  ---    ---      ---     ---
  ---    ---      ---     ---

Advertising -

Display your Vcard at venues? Y☐ N☐       360
Display your approved flyer? Y☐ N☐

*FIG. 3*

SYSTEM AND METHOD FOR ADJUSTING ENVIRONMENTAL CONDITIONS AT A VENUE BASED ON REAL TIME USER-SPECIFIED DATA

TECHNICAL FIELD

The present invention relates generally to systems and methods for adjusting real time environmental conditions based on cumulative preferences of users at a venue.

BACKGROUND

The statements in this section merely provide background information related to the present disclosure and may not constitute prior art.

Venues such as restaurants, bars, clubs, gyms, shopping establishments, and gathering places rely on events and/or repeat customers to stay in operation. In this regard, venues typically establish a business plan which focuses on providing a pleasant customer experience. The customer experience is often based on personal preferences of a customer which range from atmospheric preferences such as lighting and temperature, entertainment preferences such as music or television offerings, and/or food and beverage preferences such as drink specials, for example.

To this end, such preferences are considered by the venue management who endeavor to satisfy customers based solely on quantitative data that has been compiled over time. For example, a venue may decide to offer a particular drink special on a particular month based on sales data from the same month the previous year. While this is useful in establishing past preferences, such methodologies do not take into account the quantitative data about the likes and dislikes of the people on-site, and in real time.

In addition to the above, many venues have started "geo locational" marketing campaigns, where consumers who are close to the business get texts for special offers. Again, such a system may be useful for attracting the attention of a potential customer, but does nothing to enhance the customers experience when they are at the venue, and therefore do not increase the likelihood of that customer returning to the establishment in the future.

Rather than relying on past preferences, or pushing information to a potential customer, as has been the norm, it would be beneficial to provide a system and method for providing user-specified data to participating venues, in order to allow the venue to make solid and sound business decisions dynamically based on the real-time interests of customers that are currently at their location.

SUMMARY OF THE INVENTION

The present invention is directed to a system and method for providing user-specified data to participating venues. One embodiment of the present invention can include a system services environment having a device and/or website or App, and that facilitates communication between a user and a venue through the web. Upon establishing communication, a user can upload a plurality of user preferences for storage through a blockchain and/or by the system environment server. The preferences can include video preferences and/or content, music preferences, atmospheric preferences, food and beverage preferences, and user-generated advertising preferences.

In one embodiment, the system can identify the presence of each user interface device that is physically located at a venue, and the system environment display can generate a report containing the cumulative favorite selections within each preference category submitted by each of identified user interface devices.

In one embodiment, the report can be submitted to the venue for viewing on the venue interface device, and the environmental conditions can be adjusted manually by the venue staff. Additionally or alternatively, the report can be submitted to the venue interface device which can then automatically instruct any number of secondary devices to change the environmental conditions based on the report.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

FIG. 3 shows an exemplary user interface of the system of FIG. 1.

DETAILED DESCRIPTION OF THE INVENTION

Figure 1:
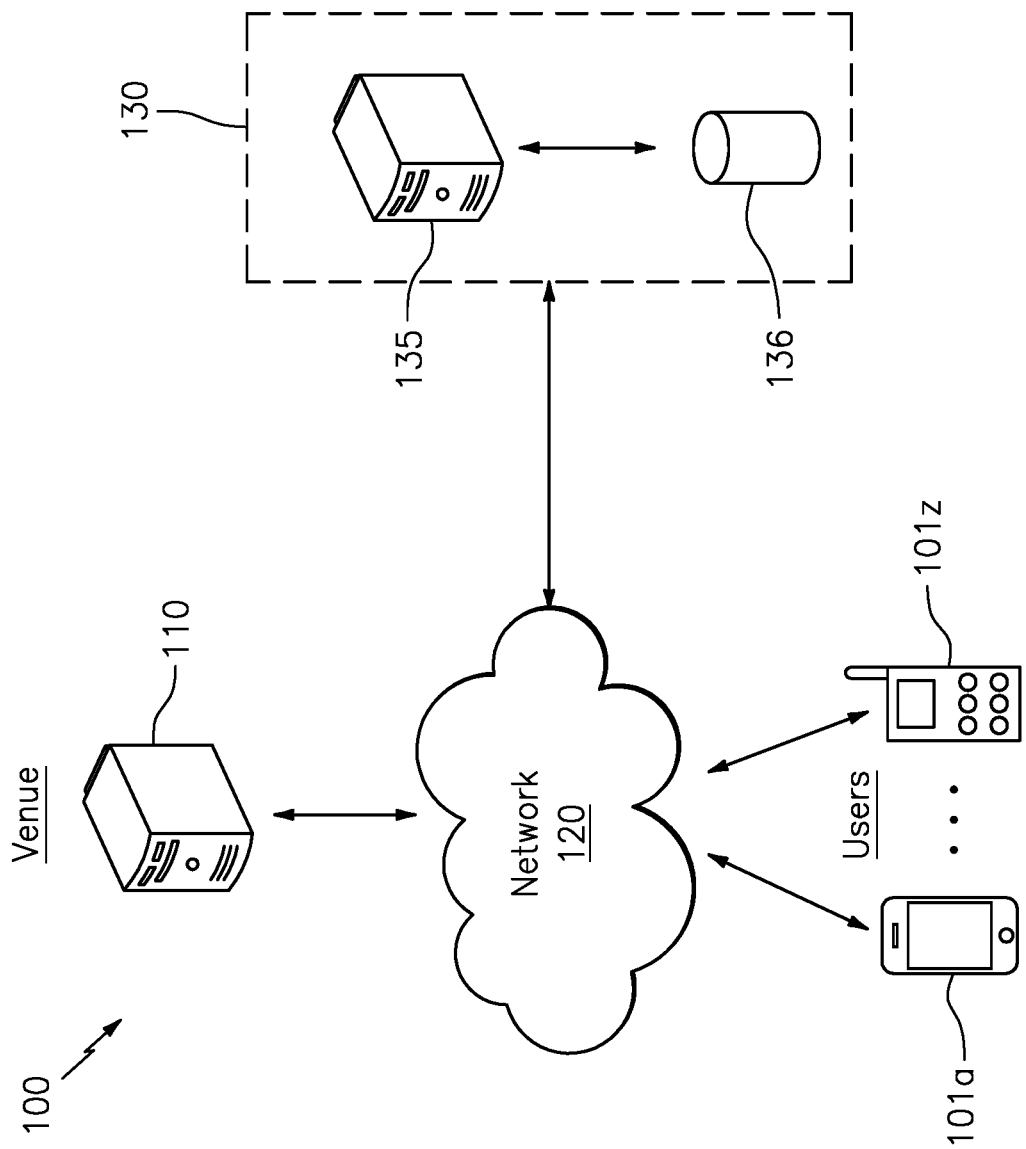
FIG. 1 shows an exemplary blockchain enabling and/or network environment according to some embodiments of the technology.

One embodiment of a system and method for providing user-specified data to participating venues is provided below. Unlike traditional marketing and management methods for improving customer experience, the present system allows users to push their data to a venue for their personal benefit. Such a system advantageously allows customers to advertise their business, push messages, hear their preferred music and/or impact the food, beverage and environmental conditions they experience in real time.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure.

DEFINITIONS

As described herein, the terms "user" and "consumer" can be used interchangeably to describe any person who utilizes one or more aspects of the system and method, to provide user-specified data to a participating venue.

The term blockchain can include a digitized, decentralized, public ledger of all cryptocurrency transactions. A blockchain is made up of Nodes. A Node (a device or computer connected to the blockchain network) gets a copy of the blockchain, which is downloaded automatically.

The term "Venue" can be used to describe any physical or virtual location that utilizes one or more aspects of the system to receive user-specified data. Several contemplated examples include, but are not limited to: restaurants, bars, nightclubs and gyms. Likewise, the term "venue management" can refer to any person utilizing and/or implementing the user-specified data at or on behalf of a venue.

The term "system administrator" can be used to describe the individual, group or legal entity that is overseeing, providing and/or performing various aspects of the below described system. More specifically, such terms describe the individuals overseeing the system services environment 150.

The term "user-specified data" and derivatives thereof can refer to any type and form of information about a particular user, which the user desires to make available to a particular venue. Typically, such data will be presented to the system during a registration process whereby the user can upload personal information ranging from their atmospheric preferences such as lighting and temperature, entertainment preferences such as music or television offerings, and/or food and beverage preferences such as favorite food type and drink specials, for example. Of course, the system may also be provided with customer information from third party sources such as integration with customers social media accounts or affiliated systems, for example.

In various embodiments, the system and method for providing user-specified data to participating venues can include one or more websites having any number of different URL addresses. Additionally, it is contemplated that several different methods and/or method steps can be performed simultaneously via different websites and/or blockchain based applications that are directed towards different individual markets and/or geographic locales. Such methods can be performed under the direct supervision of the original system administrator, or via secondary system administrator through a franchise or other form of legal agreement.

Additionally, various aspects of the system can be presented in the form of a smartphone mobile application (i.e., App) which can be preloaded onto a smartphone device and/or device which can be linked to any display, or downloaded and installed as an application after purchase of the smartphone device. Of course, the inventive concepts disclosed herein are not to be construed as limiting to a smartphone App, as virtually any type of instruction sets, in any form of programming language that can be executed on any type of processor enabled device are also contemplated.

Moreover, although illustrated throughout this document as utilizing a user-portable electronic device in the form of a smartphone, the invention is not so limiting. To this end, those of skill in the art will recognize that any type of processor enabled device that is capable of receiving user instructions and communicating information with a secondary device can be utilized herein. As such, various embodiments of the present system can also be performed wherein the portable electronic device comprises a purpose-built machine that is pre-encoded with the below described application interface, so as to perform the functionality so described.

FIG. 1 is a schematic illustration of an exemplary operating environment 100 for implementing a system for providing user-specified data to participating venues. As shown, the system 100 can include any number of user interface devices 101a-101z, at least one venue interface device 110, a communication network 120 and a system services environment 130.

Each of the interface devices 101 and 110 can be a computing device that is operated by a human user. A computing device refers to any device with a processor and memory that can execute instructions. Computing devices include, but are not limited to, smartphones, tablet computers, personal computers, laptop computers and other such devices. In either instance, each of the computing devices can include one or more client applications, such as a conventional web browser and/or text messaging functionality, for example, which can allow the device user to communicate with other interface devices and/or the system services environment 130.

The system services environment 130, can facilitate delivery of multiple user preferences to a venue at which the user(s) may or may not be currently located. Once the information is received, the venue can adapt the current environment to be more pleasing to the users in real time, thereby improving the users experience and increasing the likelihood of repeat business by the users.

In various embodiments, the system services environment 130 includes, comprises or consists of one or more individual computing devices 135 that are connected to one or more databases and/or blockchain networks and/or operating systems 136 on which various portions of the system and method can be performed. The system services environment 130 can function to provide a central hub and/or decentralized hub for controlling and facilitating communication between the user interface devices 101, and the venue interface devices 110. In various embodiments, one or more of the individual computing devices 135 can comprise a web server, an email server, an application database server and so forth, or the system can employ a single server device and/or completely decentralized infrastructure based on the blockchain which functions to handle each of these processes.

The database 136 can function to receive and store any form of information whether centralized or decentralized through a blockchain architecture, and can include any type of computer-readable storage mediums, including all forms of volatile and non-volatile memory such as, for example, semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. In addition, the devices can be operatively coupled to a communications network, such as network 120, to receive instructions and/or data from the network and/or to transfer instructions and/or data to the network.

The database can function to house any number of computer program products, i.e., a computer program tangibly embodied in a non-transient machine-readable storage device, for execution by, or to control the operation of, a data processing apparatus. The computer programs can be written in any form of computer or programming language, including source code, compiled code, interpreted code, scripting code (e.g., JavaScript) and/or machine code, and the computer program can be deployed in any form, including as a stand-alone program, a decentralized code repository and/or as a subroutine, element, or other unit suitable for use in a computing environment.

As such, the database 136 and/or a decentralized blockchain infrastructure can function to store the user-supplied information, and can include functionality for sorting multiple user supplied information into categories for dissemination to a particular venue, based on the preferences of the users currently at the venue.

The network 120 can be any type of network, including a local area network ("LAN"), such as an intranet, a wide area network ("WAN"), such as the internet, a completely decentralized network through any kind of blockchain infrastructure and/or any combination thereof. Further, the communication network 120 can be a public network, a private network, or a combination thereof. The communication network 120 can also be implemented using any number of communications links associated with one or more service providers, including one or more wired communication links, one or more wireless communication links, or any combination thereof. Additionally, communication network 120 can be configured to support the transmission of data formatted using any number of protocols.

To facilitate communication via the network, each of the interface devices can also include a communication interface configured to receive a communication, such as a request, data, etc., from another computing device in network communication with the computing device and pass the communication along to an appropriate module running on the computing device. The communication interface can also be configured to act as blockchain enabled NODES and send a communication to another computing device or NODE within network communication with the computing device. The communication nodes will have a unique public and/or private key for identification purposes within the communication network.

Figure 2:
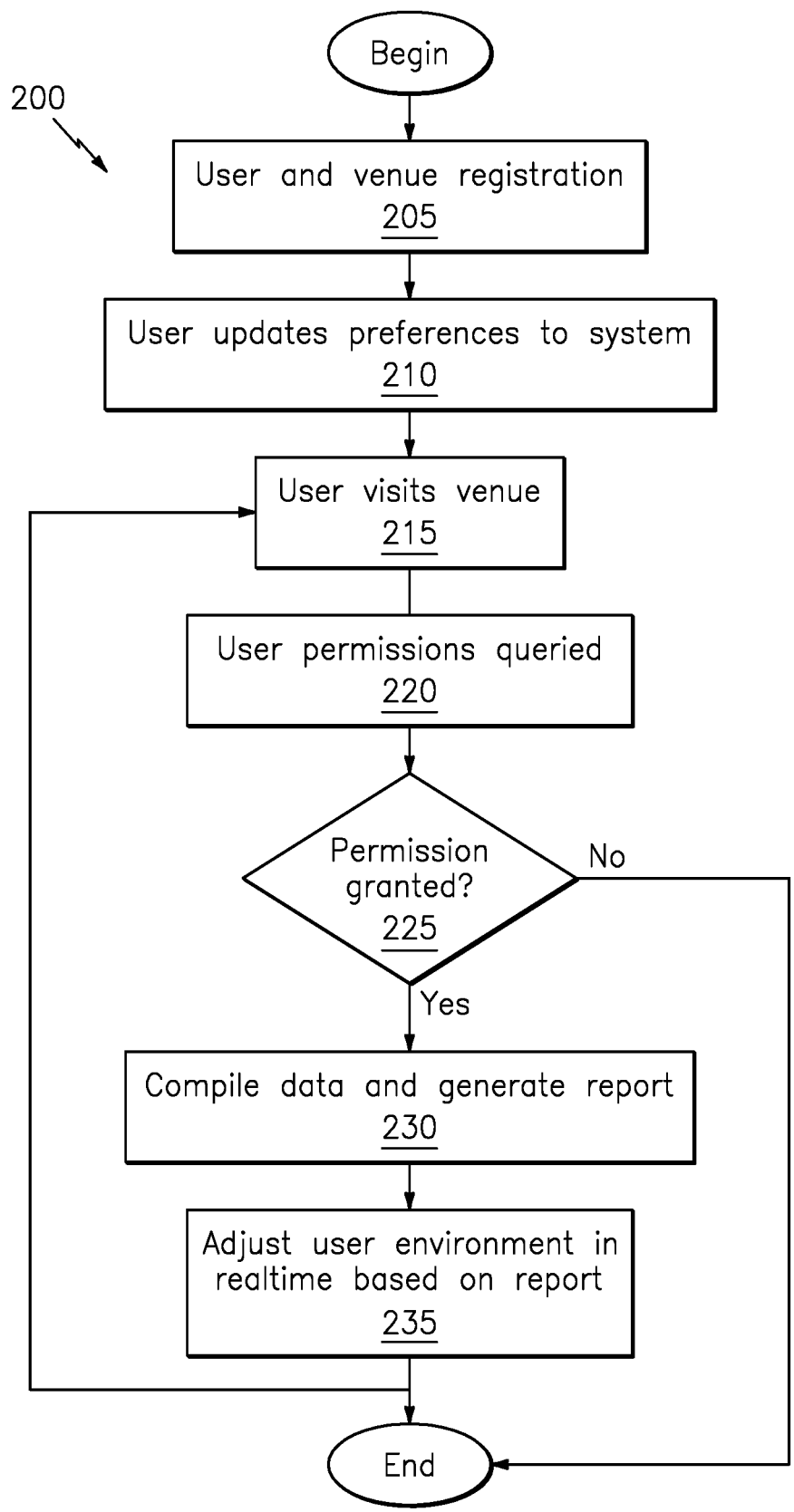
FIG. 2 shows an exemplary flow diagram illustrating a method for adjusting environmental conditions at a venue based on real time user-specified data, according to one embodiment.

FIG. 2 illustrates one embodiment of a method for providing user-specified data to participating venues utilizing the network system 100. Although described below with respect to particular steps and screens, this is for illustrative purposes only, as the methodology described herein can be performed in a different order than shown, and the presentation screens can include any number of additional information and features.

The method can begin at step 205 wherein users 101 and venues 110 can register accounts with the system environment 130, and can be provided access to the system. The registration process can include paid or unpaid options, and can be facilitated through use of the above noted interface devices that can communicate via a mobile APP or through the system website, for example. In various embodiments, the registration process can include providing dedicated hardware components to select venues, as will be described below.

Next, the method can proceed to step 210 wherein a registered user can provide user specified data to the system that includes their particular preferences.

FIG. 3 illustrates one embodiment of a user preferences presentation screen 300 that can be generated by the system environment 130 and delivered to the user interface device 101 via a mobile App or through the system website. As shown, the presentation screen 300 can include any number of different options which can be grouped into a plurality of categories for access by the user.

In one embodiment, the presentation screen 300 can include a user settings category 310 in order to allow the user to establish if a particular venue is authorized to receive their user preferences. To this end, the user can authorize any requesting venue to be automatically provided the users preferences, to be automatically denied the users preferences, and/or to be contacted so as to individually approve each request for the user's preferences. The category can also provide options for allowing some or all of their preferences to be provided to a participating venue. Such a feature ensures the users privacy is respected at all times.

In one embodiment, the presentation screen 300 can include a category relating to a user's preferred visual entertainment preferences 320. This category can allow the user to provide their favored content for display on the video screens, table displays, holograms or other visual devices at a participating venue. Several choices include favorite sports, types of movies, television, etc.

As will be described below, this information can be used in real-time to assist venues in providing enjoyable content to the users currently at the venue.

In one embodiment, the presentation screen 300 can include a category relating to a user's preferred musical entertainment preferences 330. This category can allow the user to provide their preferences regarding what they hear and how loud the music is at a venue. In various embodiments, the system can receive user playlists and other such information directly from the user interface, as well as from other applications such as streaming music services, for example. Additionally, the system can include options for allowing the user to select their preferred music by artist or genre, for example. Such information can be used in real-time to assist venues in providing music choices that are enjoyable to the majority of users currently at the venue.

In one embodiment, the presentation screen 300 can include a category relating to a user's preferred atmospheric details 340. This category can allow the user to provide their preferences regarding lighting choices, color schemes, physical temperature preferences, and the like. Such information can be used in real-time to assist venues in providing an environment that is comfortable for the majority of users currently at the venue.

In one embodiment, the presentation screen 300 can include a category relating to a user's consumables preferences 350. This category can allow the user to provide their preferences regarding what they prefer to eat and drink. Such information can be used in real-time to assist venues in providing food and drink specials that are most applicable to the majority of users currently at the venue.

In one embodiment, the presentation screen 300 can include a category relating to self-advertisements by the users 360. This category can allow the user to create advertisements that can be displayed at participating venues. Such advertisements can include virtual business cards, videos, pictures, holograms and/or messages, for example, that are created by users and that can be subsequently displayed at the venue (e.g., projected onto a big screen and/or billboard). Such a feature advantageously allows participating venues to offer free and/or paid advertising for the businesses and/or interests of users currently at the venue.

Although described above with regard to a particular screen and options, this is for illustrative purposes only. To this end, any number of additional categories and options for receiving user-specified information are also contemplated.

At step 215, the system can detect the presence of a registered user at the location of a registered venue. The detection process can be performed in any number of different manual or automated fashions. For example, users can manually "check in" to the venue using the system environment, via the venues social media, and/or by logging on to the venues WI-FI, for example. Additionally, or in the alternative, the system can utilize any number of existing platforms capable of continuously scanning for the presence of users, and notifying the system when the user is at or near a particular venue. Such systems can include geo targeting and/or proximity detection systems, for example.

At step 220, the users account can be queried to request permission to provide the user preferences uploaded at step 210 to the venue. Depending on the user settings (see 310), the request can be automatically granted, automatically denied, or the user can be contacted with an access request.

At step 225, if the user denies the request, no preferences will be provided to the user, and the method will terminate. Conversely, if the user grants the request, the method will proceed.

At step 230, the system services environment 130 can compile the information of all registered users who have chosen to provide data to the system, and that are at the same venue (hereinafter "active users"), into a series of algorithms. In various embodiments, the algorithms can perform an averaging function or other type of group data analysis to identify the most popular selections within each preference group 320-360. Such an analysis can then be associated with a report that is presented to the venue as described below.

As described herein, the "report" can be digital in nature, and can be provided in any number of different formats so as to be accessible by the venue. For example, the report can include a text file that can be displayed on the venue interface device 110 listing the above information that can be viewed in real time by the venue management.

At step 235 the venue can use the received report to customize the user environment to the particular preferences of the people in the venue at that time.

For example, the musical preferences 330 from all active users can be compiled into a report listing the groups cumulative favorite musical genre and artist, along with a preferred volume level. Additionally, the entertainment preferences 320 and atmosphere preferences 340 from all active users can also be compiled into reports listing the groups cumulative video and temperature preferences, respectively.

Moreover, the food and drink preferences 350 from all active users can be compiled into a report listing the groups cumulative favorite consumables. Such information can be updated as the day/night progresses in order to allow the venue to provide food and drink specials that will appeal to the largest number of users at the venue at any given time.

Although described above with regard to a report that is viewable by venue management, who can then manually adjust the user environment, many other embodiments are also contemplated. To this end, other embodiments are contemplated wherein the report can also include a series of digital instruction sets that can be communicated directly to any number of secondary devices, in order to allow the system 100 to automatically adjust the user environment.

Figure 4:
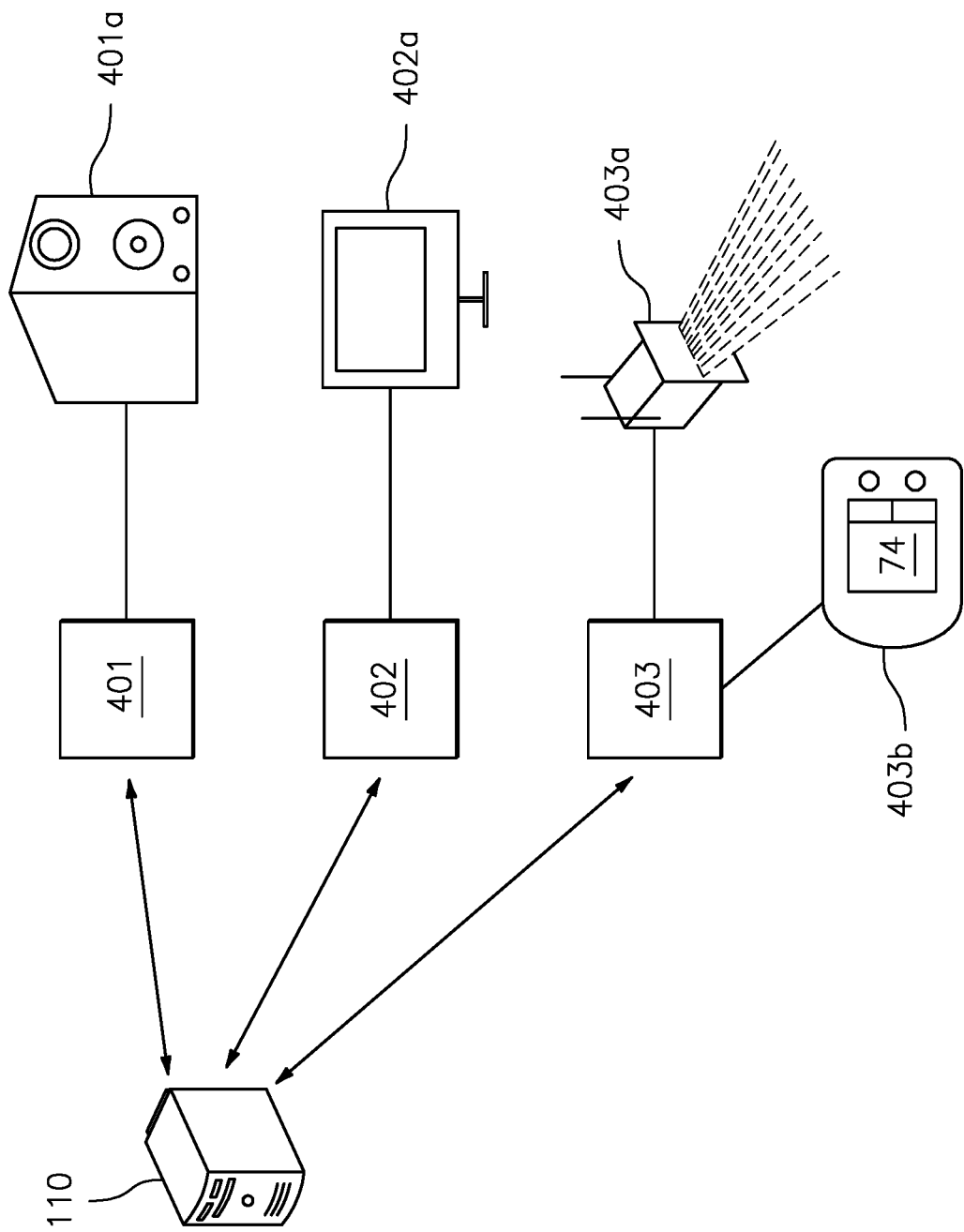
FIG. 4 shows a venue network environment according to some embodiments of the technology.

FIG. 4 illustrates one embodiment of the system wherein the venue interface device 110 is communicatively coupled to an audio controller 401, a video controller 402, and an atmospheric controller 403, for example.

The audio controller 401 can include any number of different components capable of receiving instructions and playing audible sounds via one or more speakers 401a. The audio controller can include a venues existing device, or can be provided by the system administrator. Several nonlimiting examples include a Jukebox and/or electronic DJ system, for example. In operation, the report generated at step 230 can include instructions for commanding the audio controller 401 to play a specific playlist and/or music without the intervention of the venue management.

The video controller 402 can include any number of different components capable of receiving instructions and distributing content to one or more displays 402a (e.g., monitors televisions, holograms, etc.,). The video controller can include a venue's existing device, or can be provided by the system administrator. Several nonlimiting examples include cable/satellite tuners, and internet video content tuners, for example. In operation, the report generated at step 230 can include instructions for commanding the video controller 402 to display a specific station, type of content and/or user advertisements without the intervention of the venue management.

The atmospheric controller 403 can include any number of different components capable of receiving instructions and adjusting one or more of the lighting 403a and/or temperature 403b of the venue. The atmospheric controller can include a venues existing device(s), or can be provided by the system administrator. Several nonlimiting examples include dance lighting systems and WI-FI enabled thermostats, for example. In operation, the report generated at step 230 can include instructions for commanding the atmospheric controller 401 to adjust lighting and/or the venue temperature without the intervention of the venue management.

In addition to the above, the inherent connectivity of the user interface device and the venue interface device allows the system to facilitate two-way communication between the parties. For example, the user app can be provided with a section for making requests to the venue (e.g., change the channel, change the music). Likewise, the system can be integrated with one or more text based systems to facilitate communication between the user and venue when the user is not physically at the venue. One suitable example of such a system is described in U.S. Pat. No. 9,516,478 to Beans, the contents of which are incorporated herein by reference.

Accordingly, the above described system and method function to provide user-specified data to participating venues, in order to allow the venue to adjust the customer environment dynamically, and to make solid and sound business decisions based on the real-time interests of customers that are currently at their location As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer implemented method for adjusting a user environment based on user-specified data, the method comprising:
    establishing communication between a plurality of user interface devices, a venue interface device located at a venue, and a system services environment;
    uploading, via each of the plurality of user interface devices, user-specified data containing at least one user preference in a category that includes at least one of an entertainment preference, a music preference, an atmospheric preference, a consumables preference or an advertising preference;
    storing, via a system database or a decentralized blockchain data structure, each of the uploaded user-specified data;
    detecting the presence of each of the plurality of user interface devices within a proximity of a physical location of the venue;
    generating, via the system services environment, a report containing the stored user preferences for each of the detected user interface devices, said report including a cumulative favorite selection for each user preference category;
    providing the generated report to the venue interface device; and
    adjusting a user environment at the venue in real time based on the cumulative favorite selections provided by each of the detected user interface devices.

2. The computer implemented method of claim 1, wherein the entertainment preference comprises:
    user specified content for viewing on a display at the venue.

3. The computer implemented method of claim 1, wherein the music preference comprises:
    user specified music for broadcast on a speaker at the venue.

4. The computer implemented method of claim 1, wherein the atmospheric preference comprises:
    user specified temperature and lighting conditions at the venue.

5. The computer implemented method of claim 1, wherein the consumables preference comprises:
    user specified food and drink items for consumption at the venue.

6. The computer implemented method of claim 1, wherein the advertising preference comprises:
    user specified content for display at the venue.

7. The computer implemented method of claim 1, wherein the report includes a text file for display on the venue interface device.

8. The computer implemented method of claim 1, further comprising:
    providing, via the user interface device, options for approving a request for the at least one user preference by the venue.

9. The computer implemented method of claim 8, wherein said options include
    automatically approving the request
    automatically denying the request; and
    contacting the user interface device to approve the request.

10. The computer implemented method of claim 9, wherein said contacting is performed via a text message.

11. The computer implemented method of claim 8, further comprising:
    querying the user-specified data of the detected user interface device for permission to provide the at least one user preference to the venue; and
    approving or denying the query based on a selected option.

12. The computer implemented method of claim 8, further comprising:
    providing blockchain enabled Nodes for various displays where the detected user has been approved and identified through the blockchain to enable a device to provide the at least one user preference to the venue through a series of decentralized Nodes for payment or procurement of a visual ad display, a music request, a drink request a food request or an environmental change; and
    approving or denying the query based on a selected option.

* * * * *